United States Patent
Kamei et al.

(10) Patent No.: US 12,216,349 B2
(45) Date of Patent: Feb. 4, 2025

(54) LIGHT ADJUSTMENT DEVICE MANUFACTURING METHOD

(71) Applicant: Japan Display Inc., Tokyo (JP)

(72) Inventors: Yoshifumi Kamei, Tokyo (JP); Yoshikatsu Imazeki, Tokyo (JP); Koichi Miyasaka, Tokyo (JP); Yoichi Kamijo, Tokyo (JP); Shuichi Osawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/745,235

(22) Filed: Jun. 17, 2024

(65) Prior Publication Data

US 2024/0427182 A1    Dec. 26, 2024

(30) Foreign Application Priority Data

Jun. 20, 2023   (JP) .................................. 2023-101111

(51) Int. Cl.
*G02F 1/1333*    (2006.01)

(52) U.S. Cl.
CPC .. *G02F 1/133351* (2013.01); *G02F 1/133354* (2021.01)

(58) Field of Classification Search
None
See application file for complete search history.

(56) References Cited

U.S. PATENT DOCUMENTS

2018/0188594 A1*  7/2018  Kanehiro .......... G02F 1/133514

FOREIGN PATENT DOCUMENTS

JP            2004-333567 A       11/2004

* cited by examiner

*Primary Examiner* — Thanh Nhan P Nguyen
(74) *Attorney, Agent, or Firm* — K&L Gates LLP

(57) ABSTRACT

A method of manufacturing a light adjustment device includes a panel unit in which at least four light adjustment panels each including a first substrate and a second substrate overlapping the first substrate in a first direction are stacked in the first direction, and a conductive member that is provided at an end part of the panel unit in a second direction intersecting the first direction and extends in the first direction.

7 Claims, 11 Drawing Sheets

LIGHT ADJUSTMENT DEVICE MANUFACTURING METHOD

CROSS-REFERENCE TO RELATED APPLICATION

This application claims the benefit of priority from Japanese Patent Application No. 2023-101111 filed on Jun. 20, 2023, the entire contents of which are incorporated herein by reference.

BACKGROUND

1. Technical Field

The present disclosure relates to a light adjustment device manufacturing method.

2. Description of the Related Art

A light adjustment device includes a panel unit in which a plurality of light adjustment panels are stacked (refer to Japanese Patent Application Laid-open Publication No. 2004-333567, for example) Each of the light adjustment panels includes, for example, a first substrate, a second substrate, and a liquid crystal layer encapsulated between the substrates. The panel unit is produced by, for example, stacking four mother substrates and cutting the four mother substrates in a single pass by using a cutting device such as a dicer.

A plurality of stacked mother substrates are united and have high stiffness. In a case where the stacked mother substrates are cut, the mother substrates being cut are subjected to external force due to cutting and try to deform, but are potentially damaged by cracks or the like due to cutting because the united mother substrates are difficult to deform.

SUMMARY

The present disclosure is made in view of the above-described problem and intended to provide a light adjustment device manufacturing method by which mother substrates are unlikely to be damaged by cracks or the like when being cut.

A method of manufacturing a light adjustment device according to an embodiment is disclosed the light adjustment device includes a panel unit in which at least four light adjustment panels each including a first substrate and a second substrate overlapping the first substrate in a first direction are stacked in the first direction, and a conductive member that is provided at an end part of the panel unit in a second direction intersecting the first direction and extends in the first direction. The method includes a mother substrate holding process of holding a mother substrate constituted by a plurality of the light adjustment panels connected to each other on a holding device, a cutting process of cutting the mother substrate into the light adjustment panels after the mother substrate holding process, a stacking process of stacking another mother substrate different from the cut mother substrate on the cut mother substrate in the first direction after the cutting process, a panel unit producing process of producing the panel unit by repeating the cutting process and the stacking process after the stacking process, and a conductive member forming process of forming the conductive member at the end part of the panel unit in the second direction after the panel unit producing process. The mother substrate and the other mother substrate are each constituted by one mother substrate, or the mother substrate and the other mother substrate are each constituted by two stacked mother substrates.

DETAILED DESCRIPTION

Figure 1:
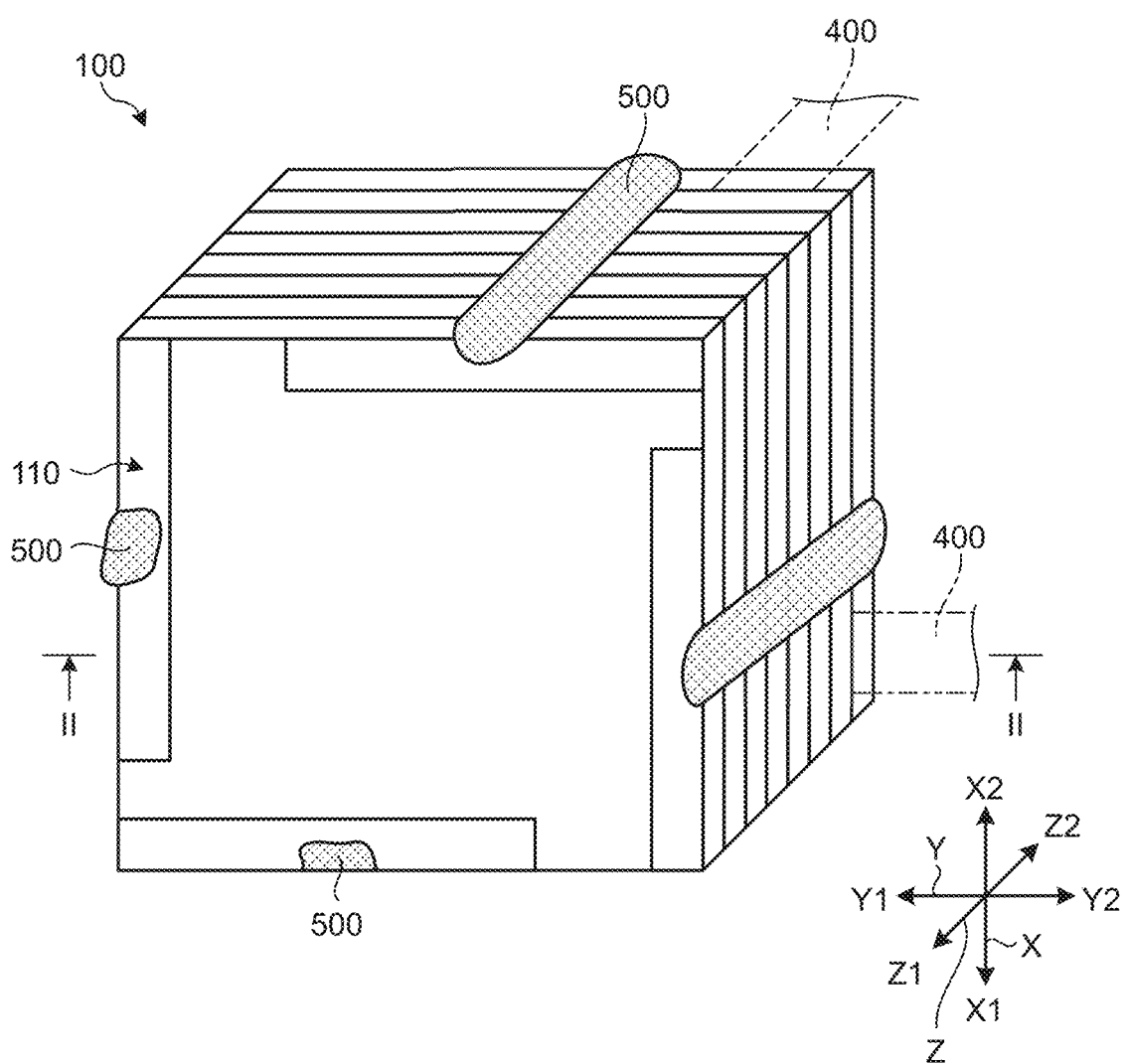
FIG. 1 is a perspective view schematically illustrating a light adjustment device according to a first embodiment.

Aspects (embodiments) of the present disclosure will be described below in detail with reference to the accompanying drawings. Contents described below in the embodiments do not limit the present disclosure.

Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases. In an XYZ coordinate system illustrated in the drawings, an X direction is the front-back direction, and an X1 side is opposite an X2 side. The X1 side is also referred to as a front side, and the X2 side is also referred to as a back side. A Y direction is the right-left direction, and a Y1 side is opposite a Y2 side. The Y1 side is also referred to as a left side, and the Y2 side is also referred to as a right side. A Z direction is the up-down direction (stacking direction). A Z1 side is opposite a Z2 side. The Z1 side is also referred to as an upper side, and the Z2 side is also referred to as a lower side.

First Embodiment

Figure 2:
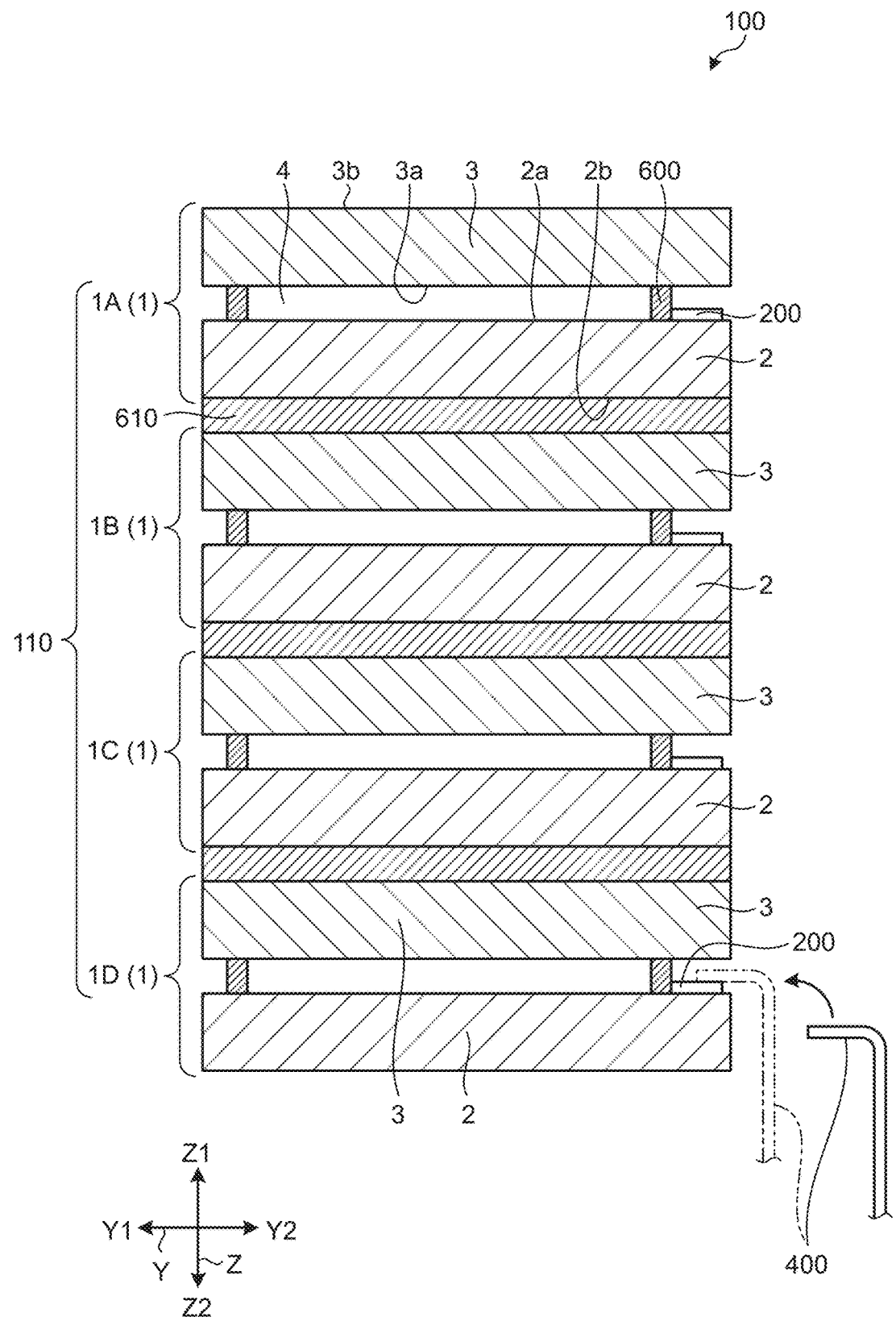
FIG. 2 is a sectional view along line II-II in FIG. 1.

FIG. 1 is a perspective view schematically illustrating the light adjustment device according to the first embodiment. FIG. 2 is a sectional view taken along line II-II in FIG. 1.

As illustrated in FIGS. 1 and 2, a light adjustment device 100 according to the first embodiment includes a panel unit 110, a conductive member 500, and a flexible printed circuit (FPC) 400 as an example of an external coupling wire. The external coupling wire is not limited to the flexible printed circuit 400 but may be a conductive wire.

As illustrated in FIG. 2, in the present embodiment, the panel unit 110 is formed by stacking a plurality (in the embodiment, four) of light adjustment panels 1 in the Z direction (first direction). The number of stacked light adjustment panels 1 may be, for example, four or more. Each light adjustment panel 1 is a square in the present embodiment, but the present invention is not limited thereto and each light adjustment panel 1 may be a polygon such as an octagon.

Specifically, as illustrated in FIG. 2, the four light adjustment panels 1 are light adjustment panels 1A, 1B, 1C, and 1D stacked in order from the upper side. Each of the light adjustment panels 1 includes a first substrate 2 disposed on the lower side, a second substrate 3 disposed on the upper side, a seal 600 provided between the first substrate 2 and the second substrate 3, a liquid crystal layer 4 filling inside the seal 600, and a terminal 200. The inside of the seal 600 is an effective region. The first substrate 2 and the second substrate 3 have equal sizes when viewed in the Z direction. The external coupling wire (flexible printed circuit 400) is electrically coupled to, for example, the terminal 200 on the first substrate 2 in the light adjustment panel 1D positioned lowermost.

As illustrated in FIG. 1, the conductive member 500 extends in the Z direction (up-down direction) at each side part of the panel unit 110. The conductive member 500 is formed by, for example, applying and curing paste containing a conductive material such as silver (Ag) or carbon (C) at each side part of the panel unit 110.

Figure 3:
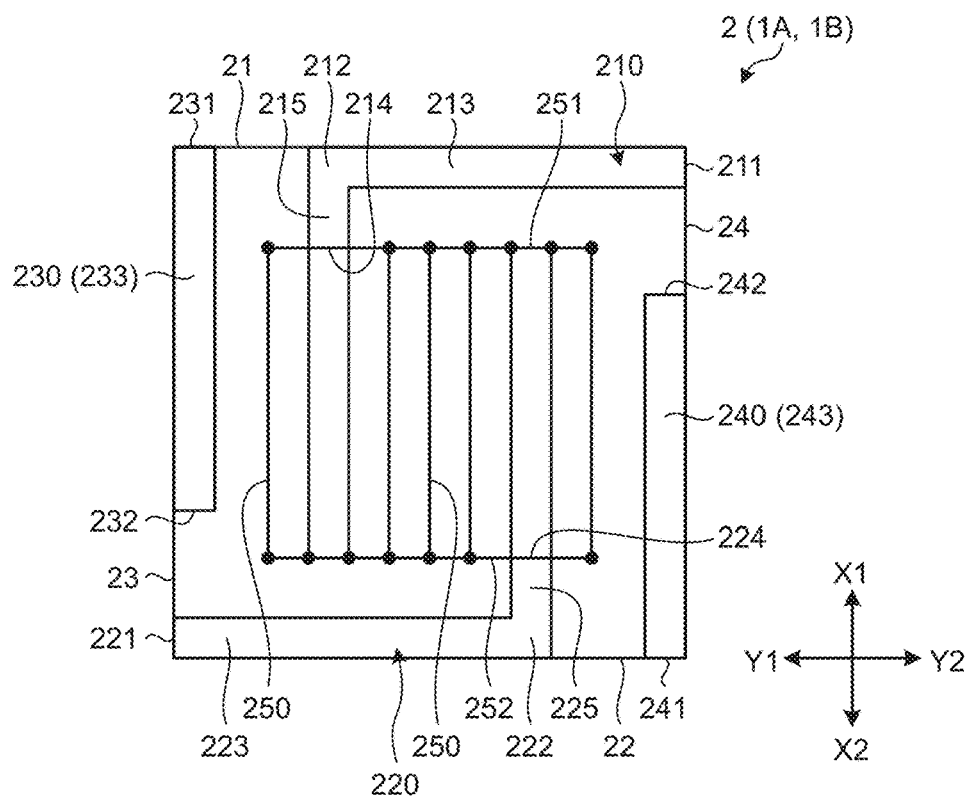
FIG. 3 is a plan view of a first substrate in each of the uppermost light adjustment panel and the second uppermost light adjustment panel illustrated in FIG. 2.
Figure 4:
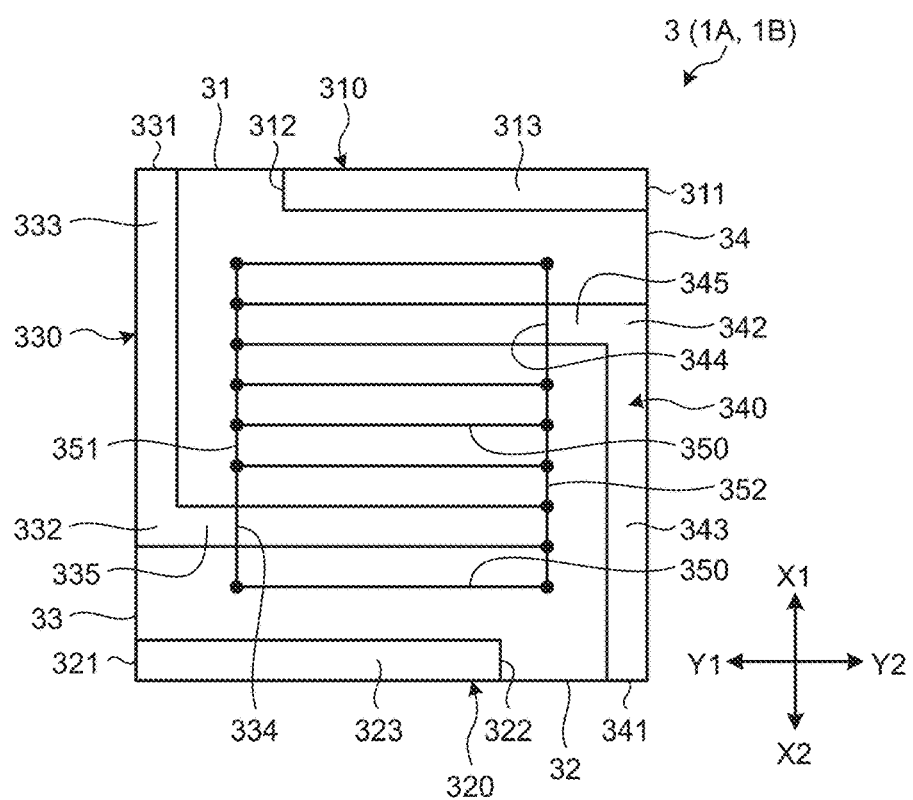
FIG. 4 is a plan view of a second substrate in the uppermost light adjustment panel and the second uppermost light adjustment panel illustrated in FIG. 2.
Figure 5:
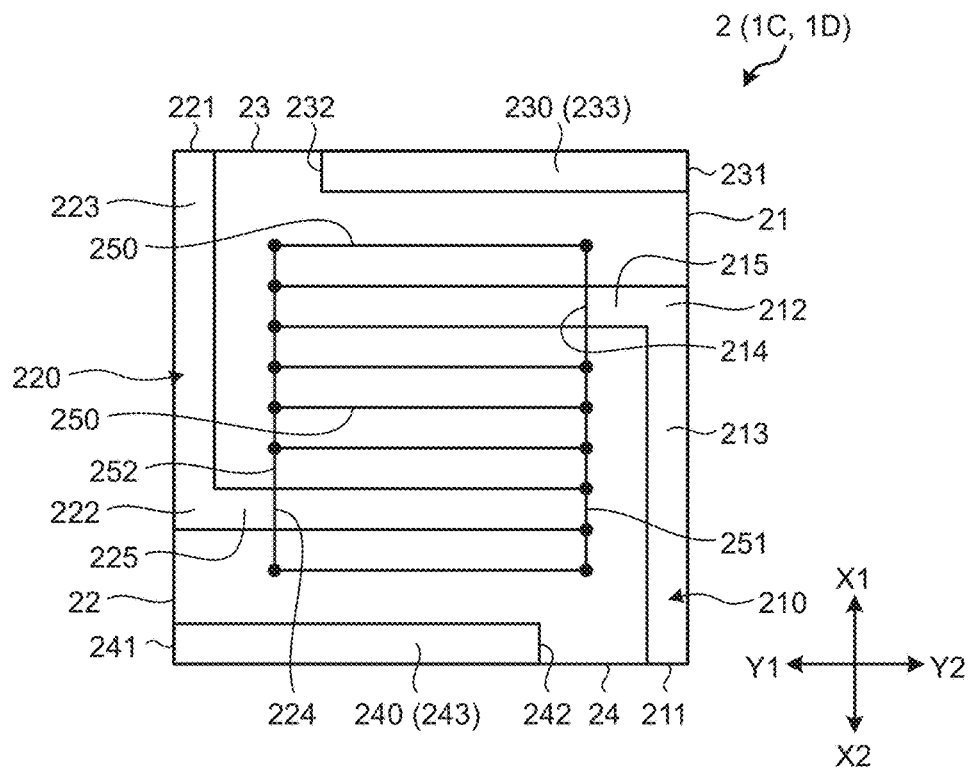
FIG. 5 is a plan view of the first substrate in each of the third uppermost light adjustment panel and the fourth uppermost light adjustment panel illustrated in FIG. 2.
Figure 6:
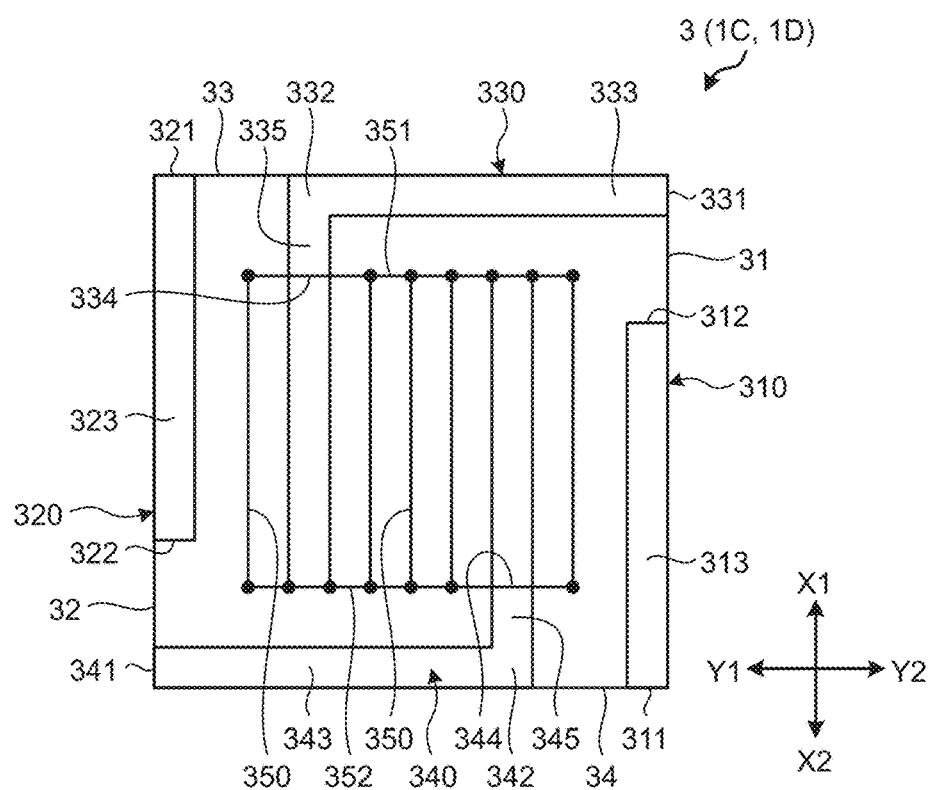
FIG. 6 is a plan view of the second substrate in each of the third uppermost light adjustment panel and the fourth uppermost light adjustment panel illustrated in FIG. 2.

Details of wires and terminals of the first and second substrates 2 and 3 included in the panel unit 110 will be described below. FIG. 3 is a plan view of the first substrate in each of the uppermost light adjustment panel and the second uppermost light adjustment panel illustrated in FIG. 2. FIG. 4 is a plan view of the second substrate in each of the uppermost light adjustment panel and the second uppermost light adjustment panel illustrated in FIG. 2. FIG. 5 is a plan view of the first substrate in each of the third uppermost light adjustment panel and the fourth uppermost light adjustment panel illustrated in FIG. 2. FIG. 6 is a plan view of the second substrate in each of the third uppermost light adjustment panel and the fourth uppermost light adjustment panel illustrated in FIG. 2.

As illustrated in FIG. 2 described above, the four light adjustment panels 1 are stacked in the order of the light adjustment panel 1A, the light adjustment panel 1B, the light adjustment panel 1C, the light adjustment panel 1D from the upper side.

As illustrated in FIG. 3, the first substrate 2 in each of the light adjustment panels 1A and 1B includes first terminals 210, 220, 230, and 240 and liquid crystal drive electrodes 250. The terminal 200 illustrated in FIG. 2 includes the first terminals 210, 220, 230, and 240. The first substrate 2 is a square in a plan view and has a first side 21, a second side 22, a third side 23, and a fourth side 24. The first side 21 is positioned on the X1 side. The second side 22 is positioned on the X2 side. The third side 23 is positioned on the Y1 side. The fourth side 24 is positioned on the Y2 side.

The first terminal 210 includes straight parts 213 and 215. The straight parts 213 and 215 are wide strips. The straight part 213 extends from an end 211 to an end 212. The straight part 213 extends along the first side 21. The straight part 215 extends from the end 212 to an end 214. The end 214 is coupled to a wire 251. The liquid crystal drive electrodes 250 are provided at the center of the first substrate 2 and electrically coupled to the wire 251. The wire 251 extends in the Y direction. A plurality of the liquid crystal drive electrodes 250 are provided and each extend in the X direction.

The first terminal 220 includes straight parts 223 and 225. The straight parts 223 and 225 are wide strips. The straight part 223 extends from an end 221 to an end 222. The straight part 223 extends along the second side 22. The straight part 225 extends from the end 222 to an end 224. The end 224 is coupled to a wire 252. The wire 252 is coupled to the liquid crystal drive electrodes 250. The wire 252 extends in the Y direction.

The first terminal 230 includes a straight part 233. The straight part 233 is a wide strip. The straight part 233 extends from an end 231 to an end 232. The straight part 233 extends along the third side 23.

The first terminal 240 includes a straight part 243. The straight part 243 is a wide strip. The straight part 243 extends from an end 241 to an end 242. The straight part 243 extends along the fourth side 24.

As illustrated in FIG. 4, the second substrate 3 in each of the light adjustment panels 1A and 1B includes second terminals 310, 320, 330, and 340 and liquid crystal drive electrodes 350. The second substrate 3 is a square in a plan view and has a first side 31, a second side 32, a third side 33, and a fourth side 34. The first side 31 is positioned on the X1 side. The second side 32 is positioned on the X2 side. The third side 33 is positioned on the Y1 side. The fourth side 34 is positioned on the Y2 side.

The second terminal 310 includes a straight part 313. The straight part 313 is a wide strip. The straight part 313 extends from an end 311 to an end 312. The straight part 313 extends along the first side 31.

The second terminal 320 includes a straight part 323. The straight part 323 is a wide strip. The straight part 323 extends from an end 321 to an end 322. The straight part 323 extends along the second side 32.

The second terminal 330 includes straight parts 333 and 335. The straight parts 333 and 335 are wide strips. The straight part 333 extends from an end 331 to an end 332. The straight part 333 extends along the third side 33. The straight part 335 extends from the end 332 to an end 334. The end 334 is coupled to a wire 351. The liquid crystal drive electrodes 350 are provided at the center of the second substrate 3 and electrically coupled to the wire 351. The wire 351 extends in the X direction. A plurality of the liquid crystal drive electrodes 350 are provided and each extend in the Y direction.

The second terminal 340 includes straight parts 343 and 345. The straight parts 343 and 345 are wide strips. The straight part 343 extends from an end 341 to an end 342. The straight part 343 extends along the fourth side 34. The straight part 345 extends from the end 342 to an end 344. The end 344 is coupled to a wire 352. The wire 352 is electrically coupled to the liquid crystal drive electrodes 350. The wire 352 extends in the X direction.

The light adjustment panels 1C and 1D illustrated in FIGS. 5 and 6 are the same as the light adjustment panels 1A and 1B rotated by 90° in the clockwise direction (rightward direction) in a plan view. Accordingly, the positions of wires, terminals, and electrodes of the first substrate 2 and the second substrate 3 included in each of the light adjustment panels 1C and 1D are the same as the positions of wires, terminals, and electrodes of the first substrate 2 and the second substrate 3 included in each of the light adjustment panels 1A and 1B rotated by 90° in the clockwise direction (rightward direction). The light adjustment panels 1A and 1B are, for example, light adjustment panels for p-wave polarization, and the light adjustment panels 1C and 1D are, for example, light adjustment panels for s-wave polarization. In this manner, the diffusion degree of light in two directions can be controlled by driving each of the light adjustment panels for p-wave polarization and the light adjustment panels for s-wave polarization.

Figure 7:
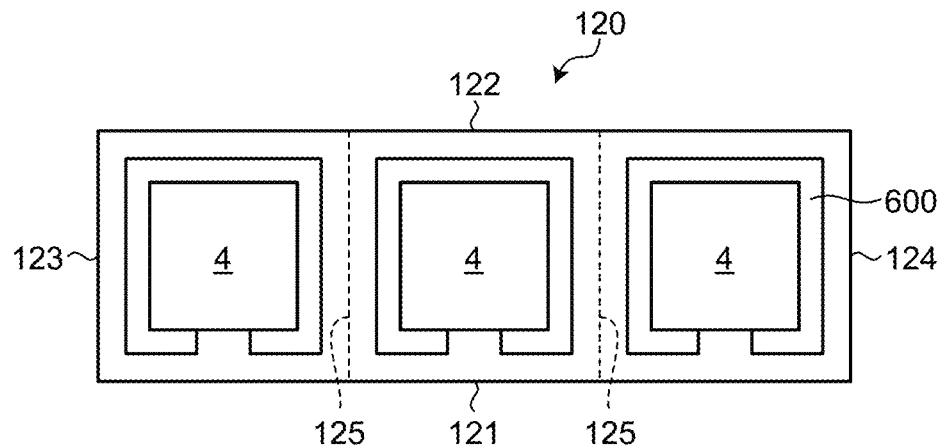
FIG. 7 is a plan view of a mother substrate.
Figure 8:
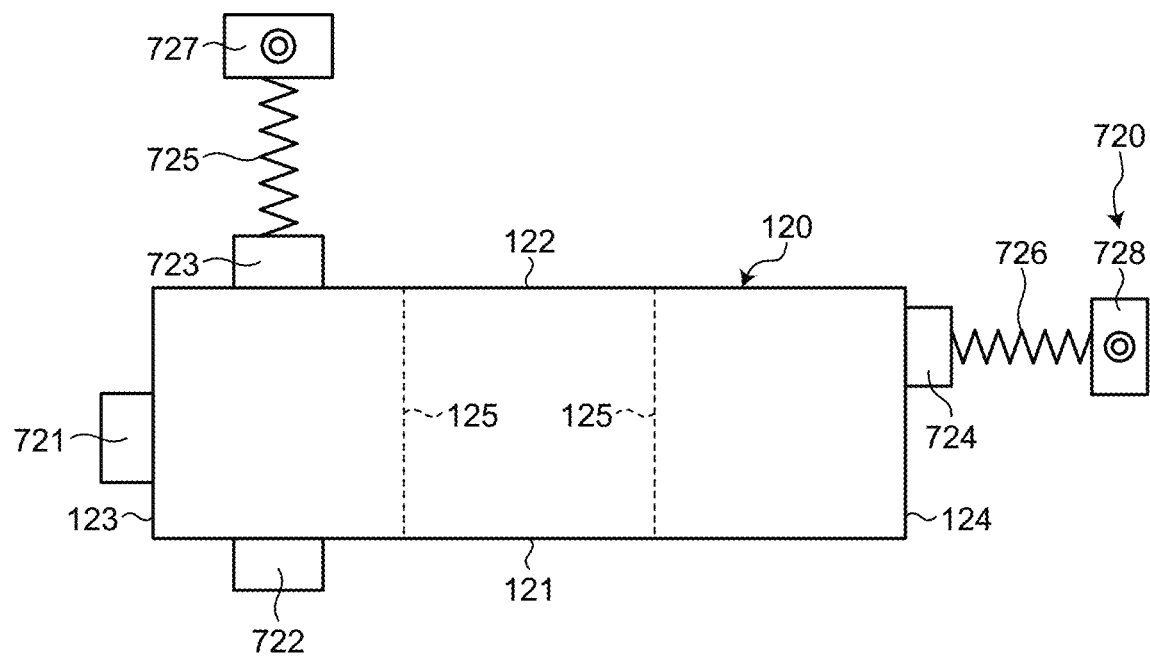
FIG. 8 is a schematic diagram of a positioning device configured to perform positioning of the mother substrate.
Figure 9:
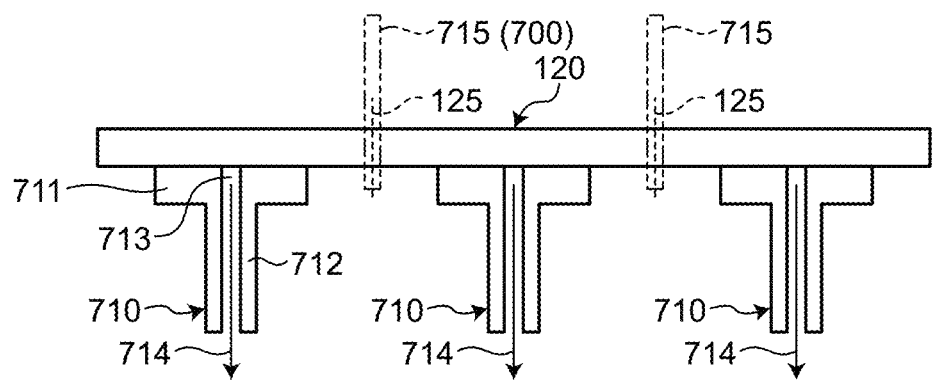
FIG. 9 is a side view schematically illustrating a first cutting process in a light adjustment device manufacturing process.
Figure 10:
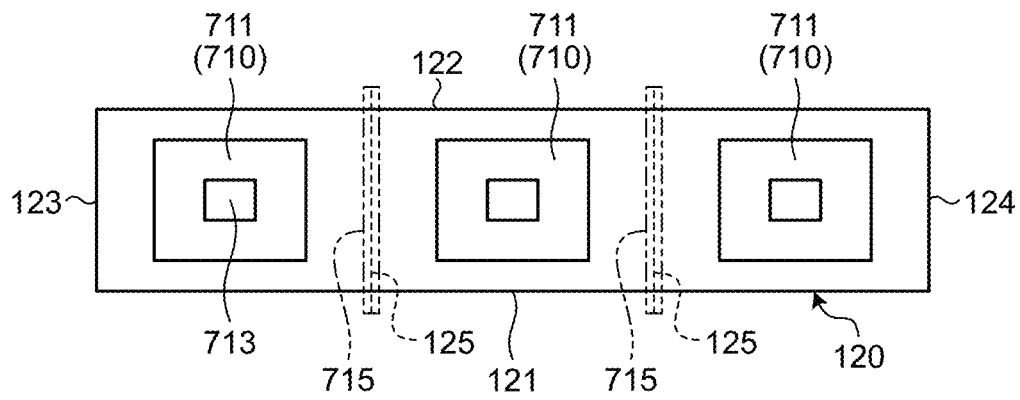
FIG. 10 is a plan view of FIG. 9.
Figure 11:
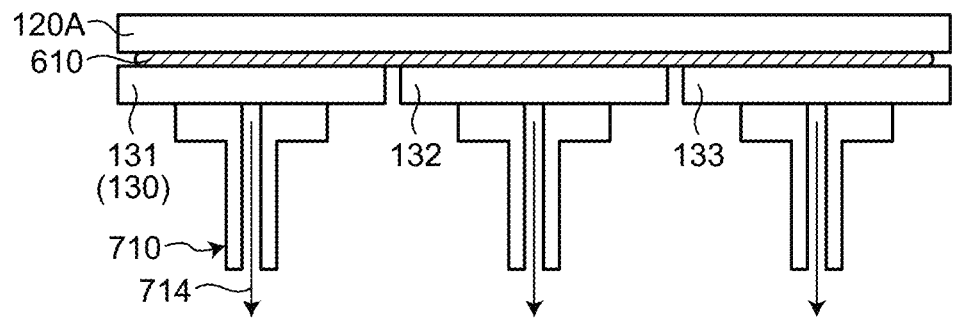
FIG. 11 is a side view schematically illustrating a second mother substrate stacking process in the light adjustment device manufacturing process.
Figure 12:
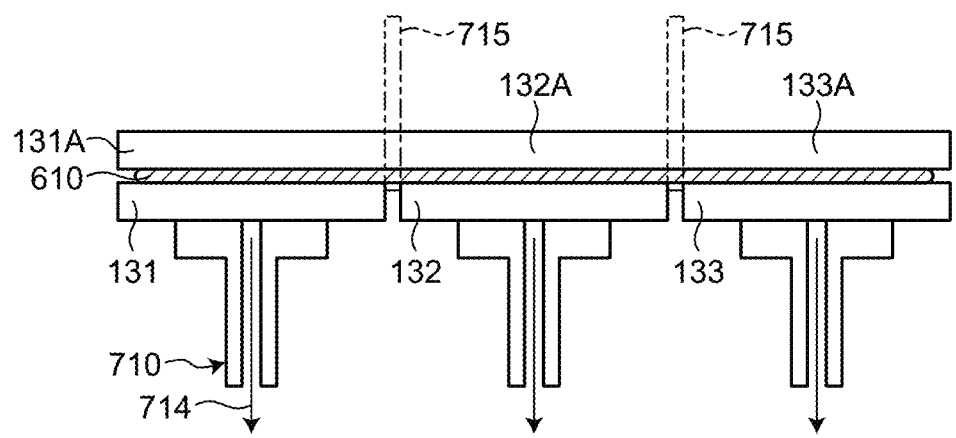
FIG. 12 is a side view schematically illustrating a second cutting process in the light adjustment device manufacturing process.
Figure 13:
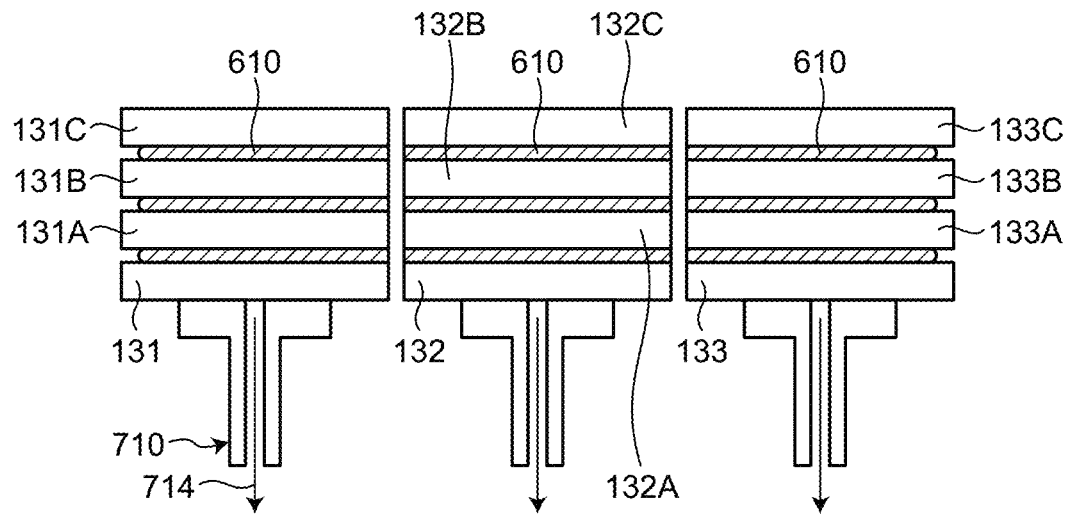
FIG. 13 is a side view schematically illustrating a state in which all cutting processes in the light adjustment device manufacturing process have ended.
Figure 14:
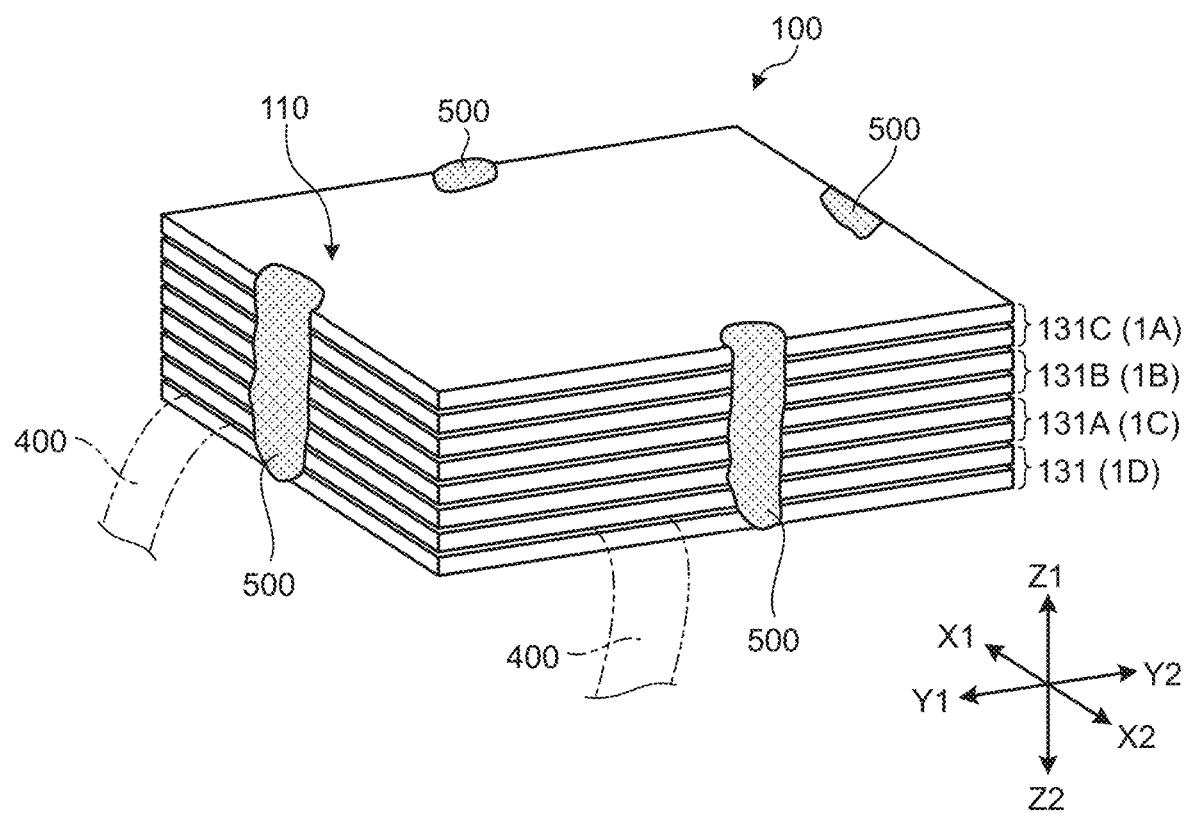
FIG. 14 is a perspective view schematically illustrating the light adjustment device according to the first embodiment.

The following describes manufacturing of the light adjustment device 100. FIG. 7 is a plan view of a mother substrate. FIG. 8 is a schematic diagram of a positioning device configured to perform positioning of the mother substrate. FIG. 9 is a side view schematically illustrating a first cutting process in a light adjustment device manufacturing process. FIG. 10 is a plan view of FIG. 9. FIG. 11 is a side view schematically illustrating a second mother substrate stacking process in the light adjustment device manufacturing process. FIG. 12 is a side view schematically illustrating a second cutting process in the light adjustment device manufacturing process. FIG. 13 is a side view schematically illustrating a state in which all cutting processes in the light adjustment device manufacturing process have ended. FIG. 14 is a perspective view schematically illustrating the light adjustment device according to the first embodiment.

First, a mother substrate 120 will be described below. The mother substrate 120 has, for example, a rectangular shape in a plan view as illustrated in FIG. 7. Specifically, the mother substrate 120 includes a first side 121, a second side 122, a third side 123, and a fourth side 124. The mother substrate 120 according to the present embodiment is constituted by three light adjustment panels 1 connected in the right-left direction. Specifically, in FIG. 7, the first substrate 2 and the second substrate 3 are stacked in a direction orthogonal to the sheet, and the seal 600 and the liquid crystal layer 4 are provided between the first substrate 2 and the second substrate 3. The three light adjustment panels 1 are obtained by cutting the mother substrate 120 in FIG. 7 along cutting lines 125. The cutting lines 125 are substantially parallel to the third side 123 and the fourth side 124.

A positioning device 720 of the mother substrate 120 will be described below. As illustrated in the plan view of FIG. 8, the positioning device 720 configured to perform positioning of the mother substrate 120 includes positioning members 721, 722, 723, and 724, pressing members 725 and 726, and fixation members 727 and 728. The positioning members contact respective sides of the mother substrate 120. The positioning member 721 contacts the third side 123. The positioning member 722 contacts the first side 121. The positioning member 723 contacts the second side 122. The positioning member 724 contacts the fourth side 124. The fixation member 727 is disposed away from the second side 122 in a direction orthogonal to the second side 122. The fixation member 727 and the positioning member 723 are coupled to each other through the pressing member 725. The pressing member 725 extends in substantially parallel to the third side 123 and the fourth side 124. The fixation member 728 is disposed away from the fourth side 124 in a direction orthogonal to the fourth side 124. The fixation member 728 and the positioning member 724 are coupled to each other through the pressing member 726. The pressing member 726 extends in substantially parallel relative to the first side 121 and the second side 122.

A holding device 710 of the mother substrate 120 will be described below. FIG. 9 is a side view schematically illustrating the first cutting process in the light adjustment device manufacturing process. FIG. 10 is a plan view of FIG. 9.

As illustrated in FIG. 9, the holding device 710 includes a placement plate 711 and a support part 712. The placement plate 711 is a flat plate having a rectangular shape in a plan view as illustrated in FIGS. 9 and 10. A through-hole 713 is provided at a central part of the placement plate 711. The support part 712 has a tubular shape inside which the through-hole 713 is provided. The through-hole 713 of the support part 712 communicates with the through-hole 713 of the placement plate 711. The holding device 710 has a vacuum adsorption function. Specifically, the support part 712 is coupled to a non-illustrated suction machine, and air 714 is sucked into the suction machine through the through-hole 713 of the support part 712. Accordingly, the mother substrate 120 can be held on the placement plate 711 by vacuum adsorption.

A cutting device 700 of the mother substrate 120 will be described below. The cutting device 700 according to the present embodiment is a dicer 715 illustrated in FIGS. 9 and 10, for example. However, in the present invention, for example, cutting using laser, cutting using a wire saw, or cutting using water jet is applicable instead of cutting with the dicer 715.

The following describes a method of manufacturing the light adjustment device 100. FIG. 11 is a side view schematically illustrating the second mother substrate stacking process in the light adjustment device manufacturing process. FIG. 12 is a side view schematically illustrating the second cutting process in the light adjustment device manufacturing process. FIG. 13 is a side view schematically illustrating a state in which all cutting processes in the light adjustment device manufacturing process have ended. FIG. 14 is a perspective view schematically illustrating the light adjustment device according to the first embodiment. The manufacturing method according to the present embodiment is characterized by cutting mother substrates one by one. Details thereof will be described below.

Mother Substrate Holding Process

In a mother substrate holding process, one mother substrate 120 is placed and held on three holding devices 710 as illustrated in FIGS. 9 and 10. The mother substrate 120 is constituted by three light adjustment panels 1 connected in the right-left direction. In other words, the three light adjustment panels 1 are produced by cutting the mother substrate 120 along the cutting lines 125. Each holding device 710 is provided for one light adjustment panel 1. The one mother substrate 120 is held on three placement plates 711 by vacuum adsorption as described above In the processes in FIGS. 9 to 13, the mother substrate is positioned by the positioning device 720 (refer to FIG. 8), but illustration of the positioning device 720 is omitted. Thus, the mother substrate is positioned by the positioning device 720 in all processes until the panel unit 110 is produced.

Cutting Process

A cutting process is performed after the mother substrate holding process. In the cutting process, the one mother substrate 120 is cut into three light adjustment panels 1 as illustrated in FIGS. 9 and 10. In the cutting process as well, the mother substrate 120 is positioned by the positioning device 720.

As described above, the cutting device 700 is, for example, the dicer 715. Specifically, three divided pieces 130 of divided pieces 131, 132, and 133 (refer to FIG. 11) are obtained by cutting along the cutting lines 125 with the dicer 715. Each of the divided pieces 131, 132, and 133 corresponds to one light adjustment panel 1.

Stacking Process

A stacking process is performed after the cutting process. In the stacking process, a mother substrate 120A different from the mother substrate 120 is stacked on the three divided pieces 130 as illustrated in FIG. 11. Specifically, a translucent bonding agent 610 is applied on the divided pieces 131, 132, and 133, the mother substrate 120A is placed on the translucent bonding agent 610, and the translucent bonding agent 610 is cured. In the stacking process as well, the mother substrate 120A is positioned by the positioning device 720.

Cutting Process

In another cutting process, the mother substrate 120A as well as the translucent bonding agent 610 is cut into three divided pieces 130 of divided pieces 131A, 132A, and 133A as illustrated in FIG. 12. In other words, the mother substrate 120A and the translucent bonding agent 610 are cut into the three divided pieces 130 of the divided pieces 131A, 132A, and 133A. Each of the divided pieces 131A, 132A, and 133A corresponds to one light adjustment panel 1.

Panel Unit Producing Process

In a panel unit producing process, the panel unit 110 is produced by repeating cutting and stacking processes. Specifically, a mother substrate is stacked on the three divided pieces 130 of the divided pieces 131A, 132A, and 133A illustrated in FIG. 13 and cut, and then another mother substrate is stacked and cut. The third lowermost mother substrate and the fourth lowermost mother substrate are the same as the lowermost mother substrate and the second lowermost mother substrate rotated by 90° in the clockwise direction (rightward direction) in a plan view.

Accordingly, the divided piece 131A is stacked on the divided piece 131, a divided piece 131B is stacked on the divided piece 131A, and a divided piece 131C is stacked on the divided piece 131B. Each of the divided pieces 131, 131A, 131B, and 131C corresponds to one light adjustment panel 1. As a result, one panel unit 110 is produced by the divided pieces 131, 131A, 131B, and 131C.

Similarly, the divided piece 132A is stacked on the divided piece 132, a divided piece 132B is stacked on the divided piece 132A, and a divided piece 132C is stacked on the divided piece 132B. One panel unit 110 is produced by the divided pieces 132, 132A, 132B, and 132C.

In addition, the divided piece 133A is stacked on the divided piece 133, a divided piece 133B is stacked on the divided piece 133A, and a divided piece 133C is stacked on the divided piece 133B. One panel unit 110 is produced by the divided pieces 133, 133A, 133B, and 133C. In this manner, the three panel units 110 are produced by repeating cutting and stacking processes in the present embodiment.

Conductive Member Forming Process

A conductive member forming process is performed after the panel unit producing process. As illustrated in FIG. 14, the conductive member 500 is formed at each side part of each panel unit 110 in the conductive member forming process. FIG. 14 illustrates the panel unit 110 positioned leftmost in FIG. 13 and produced by the divided pieces 131, 131A, 131B, and 131C. The conductive member 500 is disposed at a central part of each side of the panel unit 110 in a plan view. Specifically, the conductive member 500 is formed by, for example, applying and curing paste containing a conductive material such as silver (Ag) or carbon (C) at each side part of the panel unit 110.

Lastly, the flexible printed circuit 400 is electrically coupled to the terminal 200 (refer to FIG. 2) of the panel unit 110. Accordingly, the light adjustment device 100 is completed.

As described above, the method of manufacturing the light adjustment device 100 according to the first embodiment includes a mother substrate holding process of holding one mother substrate 120 on a holding device 710, a cutting process of cutting the one mother substrate 120 into light adjustment panels 1, a stacking process of stacking another mother substrate 120A on the one cut mother substrate 120, a panel unit producing process of producing the panel unit 110 by repeating the cutting process and the stacking process, and a conductive member forming process of forming the conductive member 500 at each side part of the panel unit 110. In this manner, in the present embodiment, the mother substrate 120 and the other mother substrate 120A are each constituted by one mother substrate, and the mother substrate 120 and the other mother substrate 120A are cut one by one in the cutting process.

As described above, the panel unit 110 has been conventionally produced by, for example, stacking four mother substrates and cutting the four mother substrates. However, the four mother substrates thus stacked and united have high stiffness and thus are difficult to deform and potentially damaged by cracks or the like due to cutting.

However, in the present embodiment, the mother substrate 120 and the other mother substrate 120A are cut one by one. Accordingly, the mother substrate 120 and the other mother substrate 120A are easy to deform at cutting and unlikely to be damaged by cracks or the like due to cutting.

Moreover, according to the first embodiment, the mother substrate 120 is held on the holding device 710 by vacuum adsorption in the mother substrate holding process. Accordingly, the mother substrate 120 can be held on the holding device 710 by sucking the air 714 and can be removed from the holding device 710 by stopping the suction of the air 714. In this manner, with vacuum adsorption, it is easy to perform attachment and detachment work of the mother substrate 120.

The holding device 710 is provided for each of the light adjustment panels 1 to be obtained by cutting the mother substrate 120. Foreign objects such as fragments due to cutting fall from a cut part while the mother substrate 120 is cut, and thus when one holding device 710 is disposed for each light adjustment panel 1 to be obtained by cutting the mother substrate 120, the foreign objects are unlikely to adhere to the holding device 710.

First Modification

Figure 15:
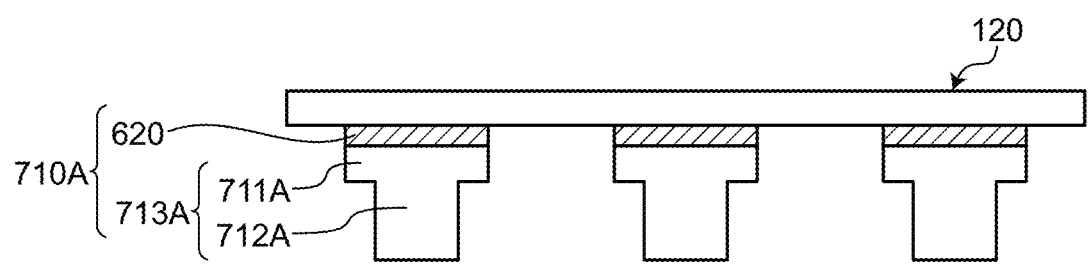
FIG. 15 is a side view schematically illustrating a holding device according to a first modification.

A holding device according to a first modification will be described below. FIG. 15 is a side view schematically illustrating the holding device according to the first modification. Although the holding device 710 having a vacuum adsorption function is applied in the first embodiment, a reversible bonding agent 620 that is detachable is applied in the first modification.

As illustrated in FIG. 15, a holding device 710A according to the first modification includes a holder 713A and the reversible bonding agent 620. The reversible bonding agent 620 is a bonding agent that can be repeatedly attached and detached. Three holders 713A are provided. Each holder 713A includes a placement plate 711A and a support part 712A. The placement plate 711A is, for example, a flat plate having a rectangular shape in a plan view. The support part 712A extends downward from the lower surface of the placement plate 711A. The reversible bonding agent 620 is provided on the placement plate 711A. The reversible bonding agent 620 joins and holds the mother substrate 120 to the placement plate 711A.

As described above, according to the first modification, the mother substrate 120 is held on the holding device 710A through the reversible bonding agent 620 that is detachable in the mother substrate holding process. With this configuration, the mother substrate 120 is held on the holding device 710A with a larger area and thus can be more stably held. Moreover, the reversible bonding agent 620 is detachable and thus can be easily removed after manufacturing ends.

Second Modification

Figure 16:
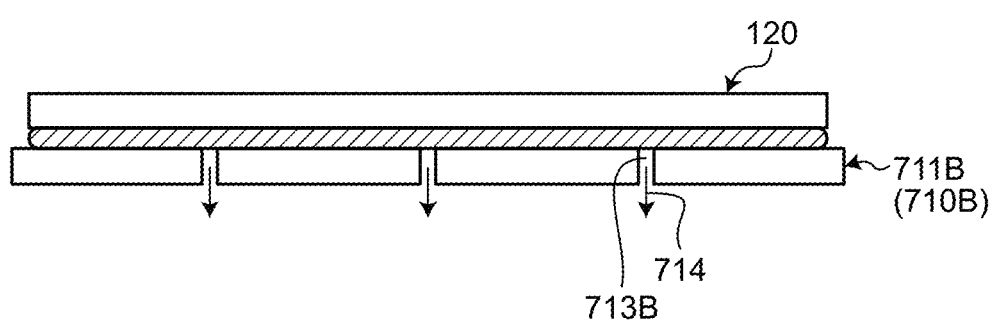
FIG. 16 is a side view schematically illustrating a holding device according to a second modification.

A holding device according to a second modification will be described below. FIG. 16 is a side view schematically illustrating the holding device according to the second modification. In the second modification, one large placement plate 711B in a plate shape has a vacuum adsorption function.

As illustrated in FIG. 16, a holding device 710B according to the second modification includes the placement plate 711B. The placement plate 711B is one large plate member. The placement plate 711B has, for example, a rectangular shape in a plan view. The placement plate 711B is provided with a plurality of through-holes 713B. The placement plate 711B is coupled to a non-illustrated suction machine, and the air 714 is sucked through the through-holes 713B of the placement plate 711B by the suction machine. Accordingly, the mother substrate 120 can be held on the placement plate 711B by vacuum adsorption.

As described above, according to the second modification, the holding device 710B includes the placement plate 711B and is provided for each mother substrate 120. With this configuration, the mother substrate 120 can be held with a larger area and thus can be more stably held.

Third Modification

Figure 17:
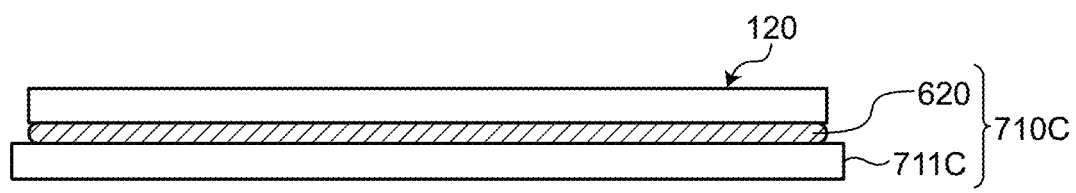
FIG. 17 is a side view schematically illustrating a holding device according to a third modification.

A holding device according to a third modification will be described below. FIG. 17 is a side view schematically illustrating the holding device according to the third modification. In the third modification, the reversible bonding agent 620 is provided on one large placement plate 711C in a plate shape.

As illustrated in FIG. 17, a holding device 710C according to the third modification includes the placement plate 711C and the reversible bonding agent 620. The placement plate 711C is one large plate member in a flat plate shape. The placement plate 711C is not provided with through-holes unlike the placement plate 711B. The reversible bonding agent 620 is provided on the placement plate 711C. The reversible bonding agent 620 joins and holds the mother substrate 120 to the placement plate 711C.

As described above, according to the third modification, the holding device 710C is provided for each mother substrate 120. The mother substrate 120 is held on the holding device 710C through the reversible bonding agent 620 that is detachable. With this configuration, the mother substrate 120 can be held with a larger area and thus can be more stably held.

Second Embodiment

Figure 18:
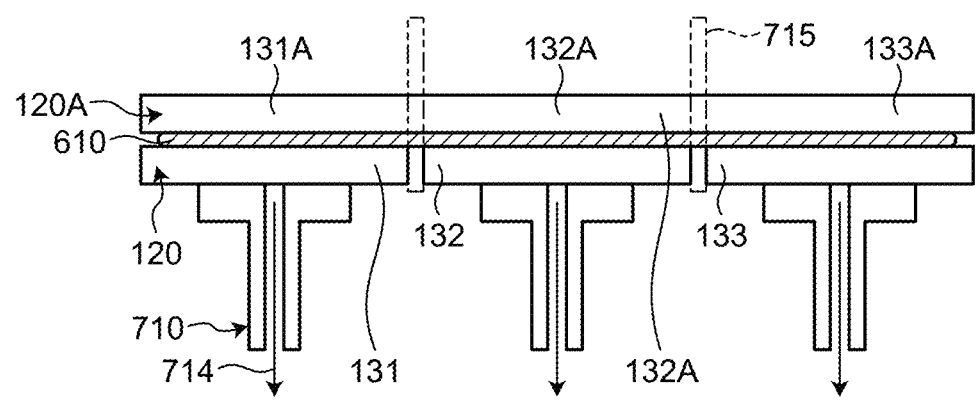
FIG. 18 is a side view schematically illustrating a first cutting process in a light adjustment device manufacturing process according to a second embodiment.
Figure 19:
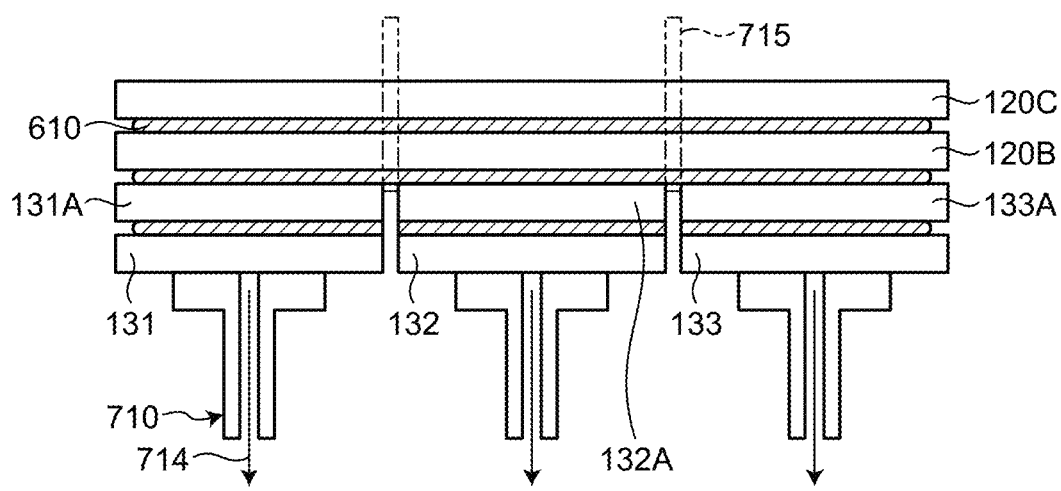
FIG. 19 is a side view schematically illustrating a second cutting process in the light adjustment device manufacturing process according to the second embodiment.

A method of manufacturing the light adjustment device 100 according to a second embodiment will be described below. FIG. 18 is a side view schematically illustrating a first cutting process in a light adjustment device manufacturing process according to the second embodiment. FIG. 19 is a side view schematically illustrating a second cutting process in the light adjustment device manufacturing process according to the second embodiment. The manufacturing method according to the second embodiment is characterized by cutting mother substrates two by two, whereas mother substrates are cut one by one in the first embodiment. Any difference from the first embodiment will be mainly described below.

Mother Substrate Holding Process

In a mother substrate holding process, two mother substrates 120 and 120A are placed and held on three holding devices 710 as illustrated in FIG. 18. The mother substrates 120 and 120A are joined to each other through the translucent bonding agent 610 in advance. Illustration of the positioning device 720 is omitted in the second embodiment as well.

Cutting Process

In a cutting process, the two mother substrates 120 and 120A are cut into light adjustment panels 1 as illustrated in FIG. 18. Specifically, the divided pieces 131 and 131A, the divided pieces 132 and 132A, and the divided pieces 133 and 133A are obtained by cutting the mother substrate 120 with the dicer 715 as illustrated in FIG. 18.

Stacking Process

In a stacking process, other mother substrates 120B and 120C are stacked on the three divided pieces 131A, 132A, and 133A as illustrated in FIG. 19. The mother substrates 120B and 120C are joined to each other through the translucent bonding agent 610 in advance. Specifically, the translucent bonding agent 610 is applied on the divided pieces 131A, 132A, and 133A, the mother substrates 120B and 120C is placed on the translucent bonding agent 610, and the translucent bonding agent 610 is cured. In the stacking process as well, the mother substrates 120B and 120C are positioned by the positioning device 720.

Cutting Process and Panel Unit Producing Process

In another cutting process, the mother substrates 120B and 120C are cut into divided pieces as illustrated in FIG. 19. Accordingly, the panel unit 110 is produced.

As described above, according to the second embodiment, the mother substrates 120 and 120A and the other mother substrates 120B and 120C are pairs of two mother substrates and cut two by two in the cutting process.

In this manner, in a case of cutting two by two as well, the mother substrates 120 and 120A and the other mother substrates 120B and 120C are easy to deform at cutting as compared to conventional cases and unlikely to be damaged by cracks or the like due to cutting. Since cutting is performed for each two of the mother substrates, the number of times of cutting is half of that in the first embodiment.

What is claimed is:

1. A method of manufacturing a light adjustment device including a panel unit in which at least four light adjustment panels each including a first substrate and a second substrate overlapping the first substrate in a first direction are stacked in the first direction, and a conductive member that is provided at an end part of the panel unit in a second direction intersecting the first direction and extends in the first direction, the method comprising:
    a mother substrate holding process of holding a mother substrate constituted by a plurality of the light adjustment panels connected to each other on a holding device;
    a cutting process of cutting the mother substrate into the light adjustment panels after the mother substrate holding process;
    a stacking process of stacking another mother substrate different from the cut mother substrate on the cut mother substrate in the first direction after the cutting process;
    a panel unit producing process of producing the panel unit by repeating the cutting process and the stacking process after the stacking process; and
    a conductive member forming process of forming the conductive member at the end part of the panel unit in the second direction after the panel unit producing process, wherein
    the mother substrate and the other mother substrate are each constituted by one mother substrate, or the mother substrate and the other mother substrate are each constituted by two stacked mother substrates.

2. The method of manufacturing the light adjustment device according to claim 1, wherein
    the mother substrate and the other mother substrate are each constituted by one mother substrate, and
    the mother substrate and the other mother substrate are cut one by one in the cutting process.

3. The method of manufacturing the light adjustment device according to claim 1, wherein
    the mother substrate and the other mother substrate are each constituted by two stacked mother substrates, and
    the mother substrate and the other mother substrate are cut two by two in the cutting process.

4. The method of manufacturing the light adjustment device according to claim 1, wherein the mother substrate is held on the holding device by vacuum adsorption in the mother substrate holding process.

5. The method of manufacturing the light adjustment device according to claim 1, wherein the mother substrate is held on the holding device through a detachable bonding agent in the mother substrate holding process.

6. The method of manufacturing the light adjustment device according to claim 1, wherein the holding device is provided for each of the light adjustment panels to be obtained by cutting the mother substrate.

7. The method of manufacturing the light adjustment device according to claim 1, wherein the holding device is provided for each of the mother substrates.

* * * * *